United States Patent
Yamamoto

(10) Patent No.: US 8,304,949 B2
(45) Date of Patent: Nov. 6, 2012

(54) AXIAL GAP MOTOR

(75) Inventor: Keiichi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/145,779

(22) PCT Filed: Nov. 20, 2009

(86) PCT No.: PCT/JP2009/069748
§ 371 (c)(1),
(2), (4) Date: Jul. 21, 2011

(87) PCT Pub. No.: WO2010/087066
PCT Pub. Date: Aug. 5, 2010

(65) Prior Publication Data
US 2011/0273034 A1 Nov. 10, 2011

(30) Foreign Application Priority Data
Jan. 28, 2009 (JP) .............................. P.2009-017042

(51) Int. Cl.
*H02K 1/27* (2006.01)

(52) U.S. Cl. ......... 310/156.38; 310/156.43; 310/156.48; 310/156.55; 310/156.57; 310/268

(58) Field of Classification Search ............ 310/156.08–156.45, 156.48, 156.53, 156.55–156.57, 156.62, 310/156.63, 156.82, 268
See application file for complete search history.

(56) References Cited

U.S. PATENT DOCUMENTS

| 7,679,260 | B2 * | 3/2010 | Yamamoto et al. | 310/268 |
| 7,737,594 | B2 * | 6/2010 | Abe et al. | 310/156.53 |
| 7,906,883 | B2 * | 3/2011 | Abe | 310/156.64 |

(Continued)

FOREIGN PATENT DOCUMENTS
JP 2001-136721 A 5/2001

(Continued)

*Primary Examiner* — Tran Nguyen
(74) *Attorney, Agent, or Firm* — Arent Fox LLP

(57) ABSTRACT

A magnet pole portion 31 is made up of an integral magnet 44 into which are integrated a main permanent magnet piece 41 which is magnetized in the direction of a rotational axis, a pair of auxiliary permanent magnet pieces 42, 42 which are disposed at circumferential sides on one side of the main permanent magnet piece 41 with respect to the direction of the rotational axis, which are each magnetized in the direction of the rotational axis and a direction which is at right angles to a radial direction and on which magnetic poles face each other which are the same as a magnetic pole on the one side of the main permanent magnet piece 41 with respect to the direction of the rotational axis, and a pair of auxiliary magnet pieces 43, 43 which are disposed at circumferential sides on the other side of the main permanent magnet piece 41 with respect to the direction of the rotational axis, which are each magnetized in the direction of the rotational axis and a direction which is at right angles to a radial direction and on which magnetic poles face each other which are the same as a magnetic pole on the other side of the main permanent magnet piece 41 with respect to the direction of the rotational axis, with portions of the main permanent magnet piece 41 being exposed to a pair of stators 12, 12.

17 Claims, 13 Drawing Sheets

U.S. PATENT DOCUMENTS

| | | | |
|---|---|---|---|
| 7,919,897 B2 * | 4/2011 | Tajima et al. | 310/216.016 |
| 7,977,843 B2 * | 7/2011 | Atarashi et al. | 310/216.074 |
| 8,035,266 B2 * | 10/2011 | Atarashi et al. | 310/156.43 |
| 8,040,008 B2 * | 10/2011 | Kawamura et al. | 310/156.32 |
| 8,049,389 B2 * | 11/2011 | Abe et al. | 310/156.62 |
| 8,053,942 B2 * | 11/2011 | Abe et al. | 310/156.64 |
| 2010/0187933 A1 * | 7/2010 | Yamamoto et al. | 310/156.29 |
| 2010/0320858 A1 * | 12/2010 | Ishikawa et al. | 310/156.07 |
| 2011/0285237 A1 * | 11/2011 | Amari et al. | 310/156.07 |

FOREIGN PATENT DOCUMENTS

| | | |
|---|---|---|
| JP | 2006-217771 A | 8/2006 |
| JP | 2006-345627 A | 12/2006 |
| JP | 2009-11023 A | 1/2009 |

* cited by examiner

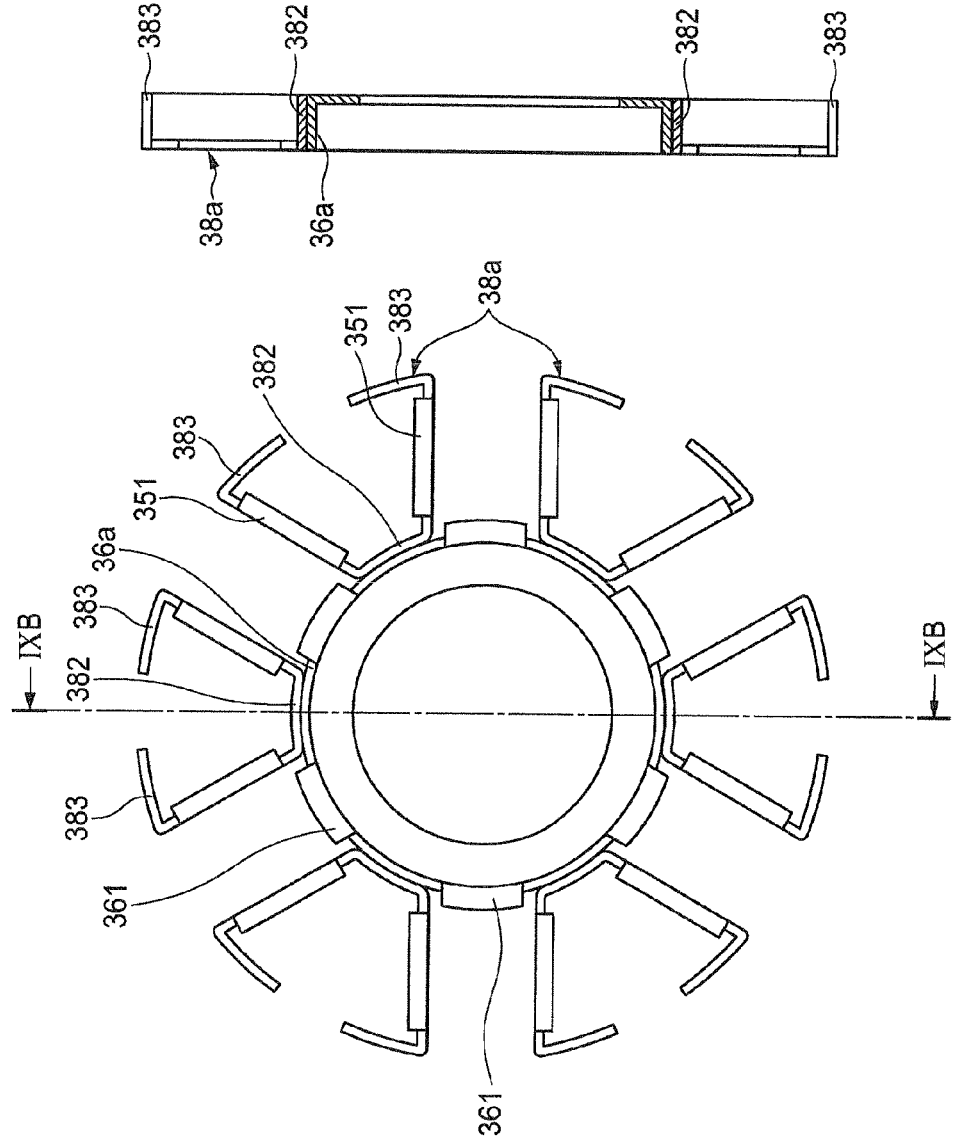

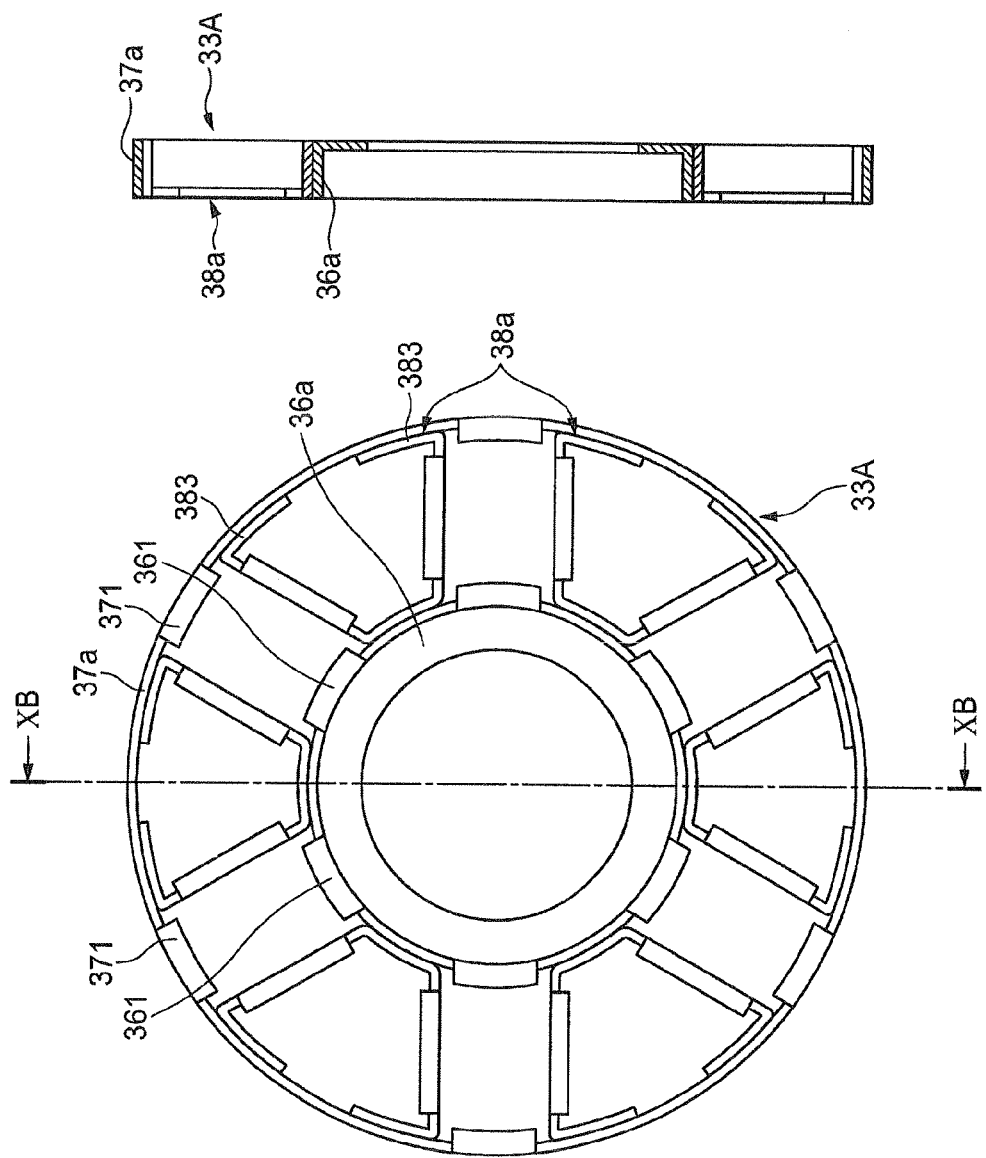

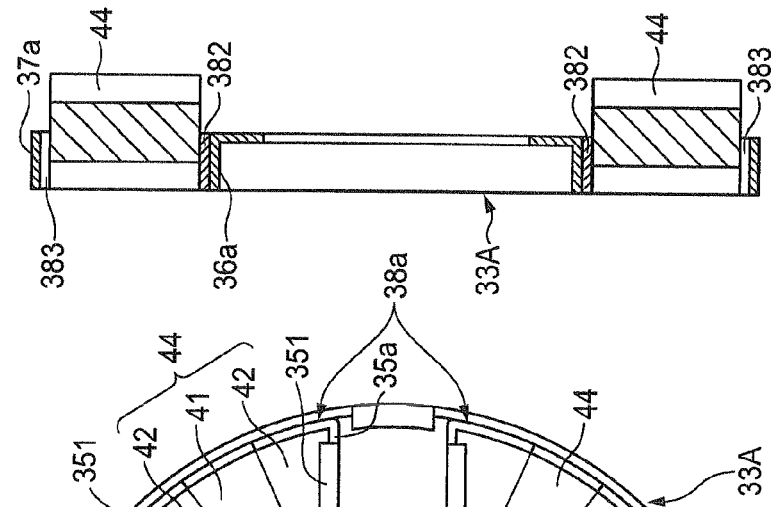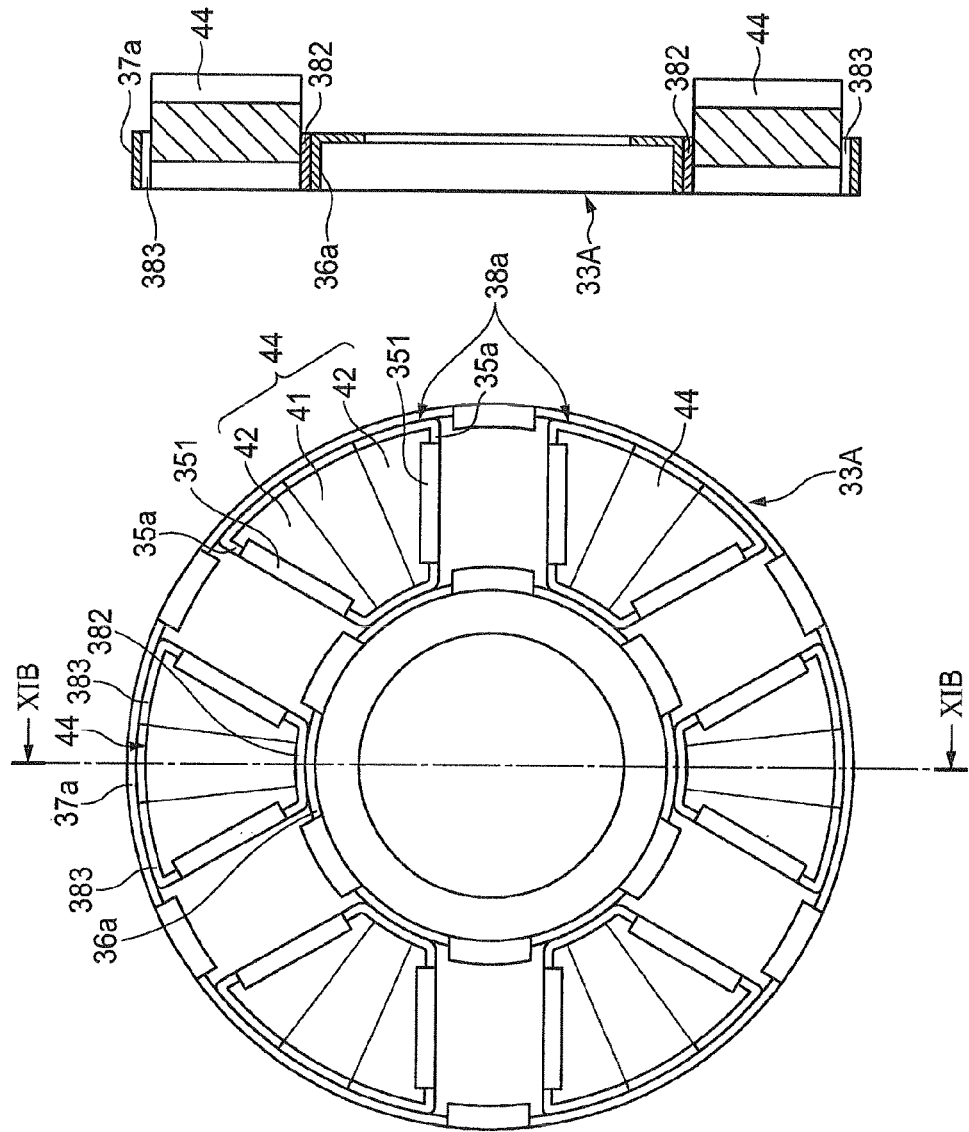

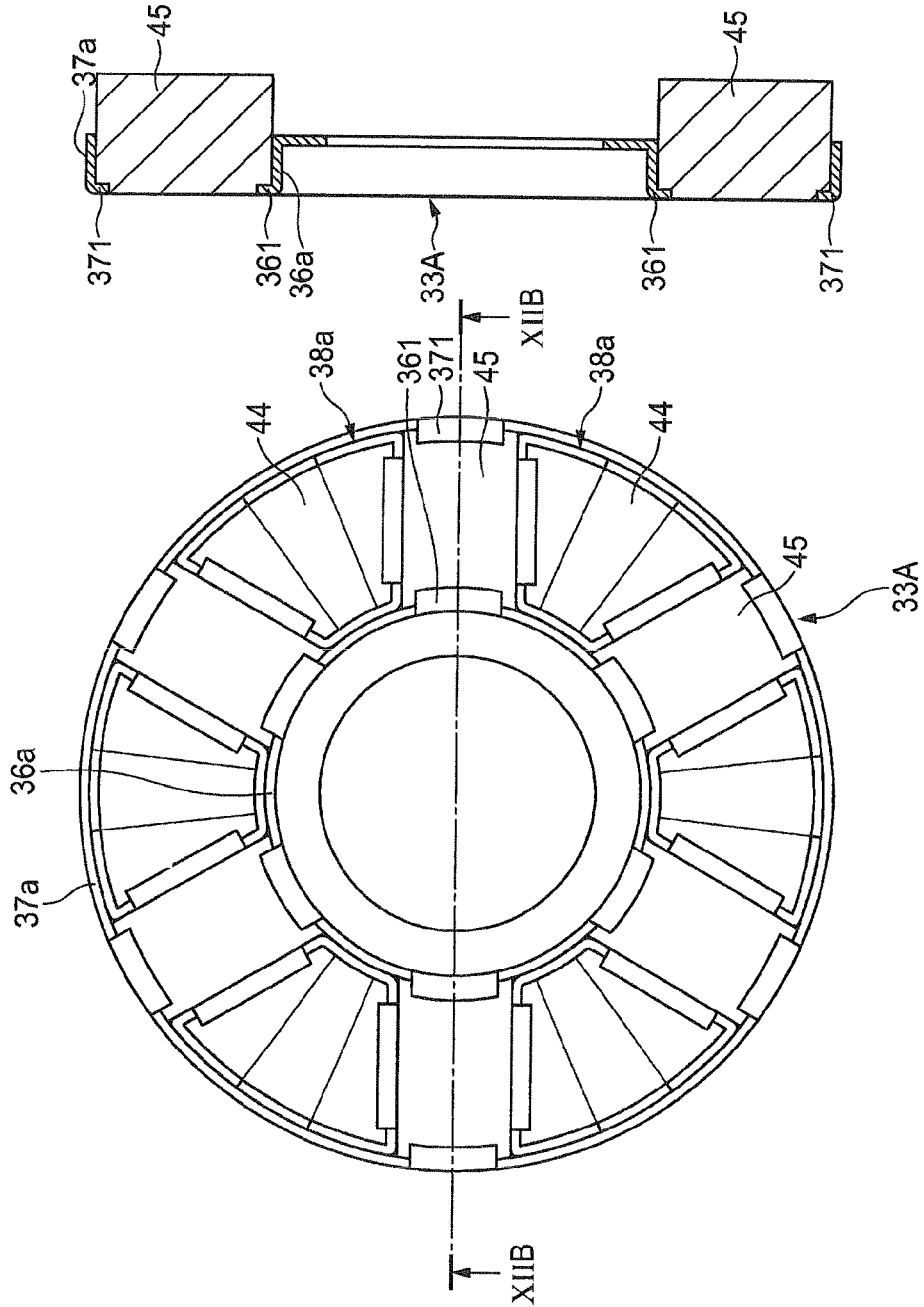

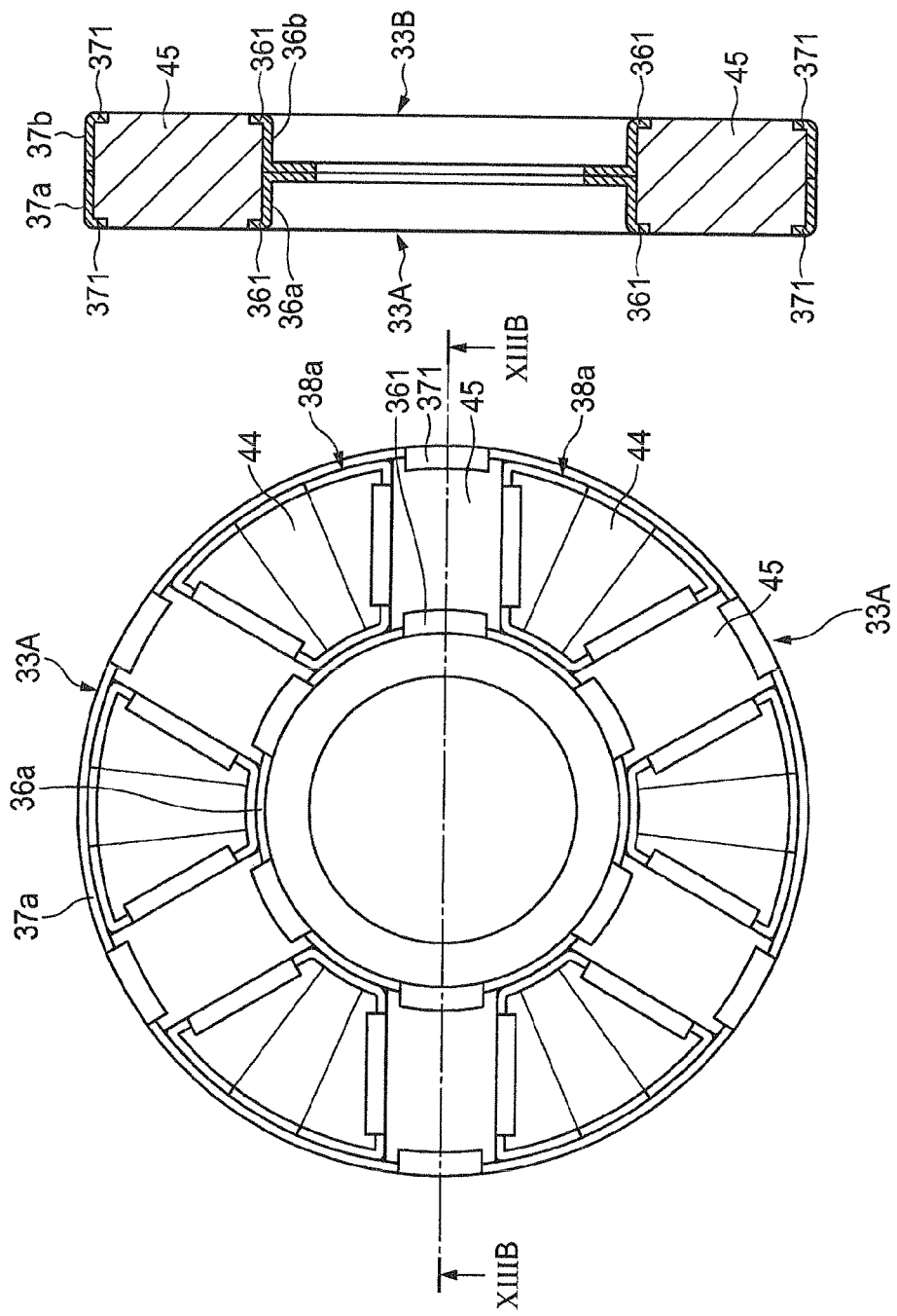

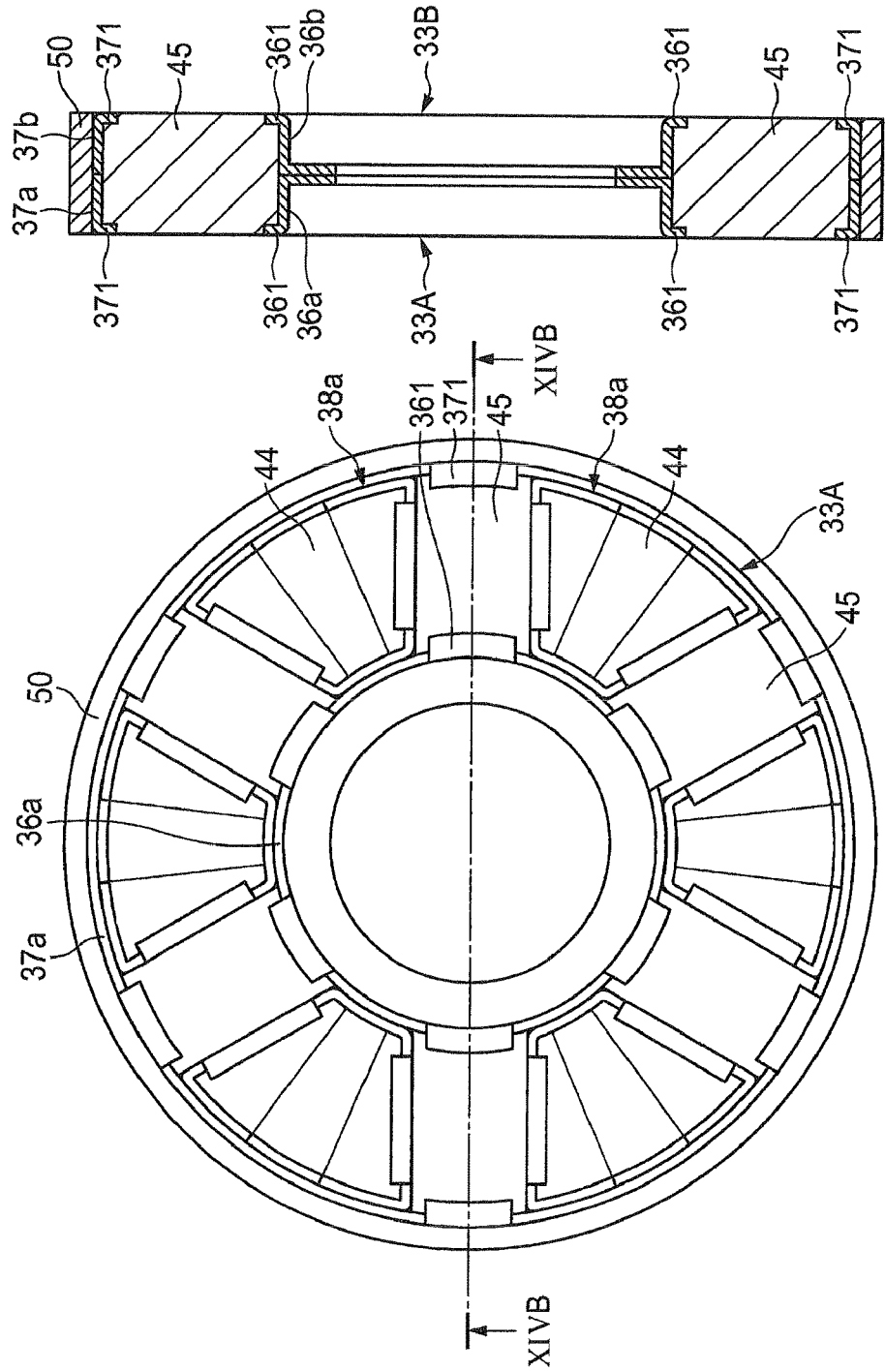

AXIAL GAP MOTOR

TECHNICAL FIELD

The present invention relates to an axial gap motor.

BACKGROUND ART

Conventionally, there have been known axial gap motors, for example, which include a pair of stators disposed to face each other so as to hold therebetween a rotor from both sides thereof with respect to the direction of a rotational axis and in which a loop of flux via the pair of stators is formed for a field flux by a permanent magnet of the rotor (refer to Patent Document 1, for example).

As is shown in FIGS. 15 and 16, an axial gap motor 100 described in Patent Document 1 includes a rotor 101 which can rotate about a rotational axis and a pair of stators 102, 102 which are disposed to face each other so as to hold therebetween the rotor 101 from both sides thereof with respect to the direction of the rotational axis. The rotor 101 includes magnet pole portions 103, . . . , 103 which are disposed at predetermined intervals in a circumferential direction and magnetic material pole portions 104 which are disposed to lie between the magnet pole portions 103, . . . , 103. These magnet pole portions 103, . . . , 103 and magnetic material pole portions 104, . . . , 104 are accommodated in a rotor frame 105.

RELATE ART DOCUMENT

Patent Document

Patent Document 1: JP-A-2001-136721

SUMMARY OF THE INVENTION

Problems that the Invention is to Solve

In the axial gap motor 100, however, since each magnet pole portion 103 is made up of a single magnet piece which is magnetized in the direction of the rotational axis, a closed loop of flux is formed between the adjacent magnetic material pole portion 104 and itself as is indicated by an arrow in FIG. 16. Because of this, a flux directed from the magnet pole portion 103 to each stator 102 is short-circuited, leading to fears that torque generated from the motor is reduced or the torque generation efficiency of the motor is reduced. In order to avoid the reductions, the thickness of spokes 106 of the motor frame 105 needs to be increased. However, when the thickness of the spokes 106 is increased, the magnet pole portions 103 and the magnetic material pole portions 104 have to be reduced in size, and hence, the torque generated cannot be increased.

The invention has been made in view of these situations, and an object thereof is to provide an axial gap motor which can suppress the generation of short-circuit of flux, so as to suppress a reduction in torque to be generated and a reduction in efficiency of the motor.

Means for Solving the Problem

The above object will be attained by the following configurations.

(1) An axial gap motor including:
a rotor adapted to rotate about a rotational axis; and
a pair of stator disposed to face each other so as to hold therebetween the rotor from both sides thereof with respect to the direction of the rotational axis, wherein
the rotor comprises:
magnet pole portions which are disposed at predetermined intervals in a circumferential direction; and
magnetic material pole portions which are disposed so as to lie between the magnet pole portions which lie adjacent thereto in the circumferential direction; and
the magnet pole portion is made up of an integral magnet into which are integrated a main magnet piece which is magnetized in the direction of the rotational axis, a pair of auxiliary magnet pieces which are disposed at circumferential sides on one side of the main magnet piece with respect to the direction of the rotational axis, which are each magnetized in the direction of the rotational axis and a direction which is at right angles to a radial direction and on which magnetic poles face each other which are the same as a magnetic pole on the one side of the main magnet piece with respect to the direction of the rotational axis, and a pair of auxiliary magnet pieces which are disposed at circumferential sides on the other side of the main magnet piece with respect to the direction of the rotational axis, which are each magnetized in the direction of the rotational axis and a direction which is at right angles to a radial direction and on which magnetic poles face each other which are the same as a magnetic pole on the other side of the main magnet piece with respect to the direction of the rotational axis, with portions of the main magnet piece being exposed to the pair of stators.

(2) The axial gap motor as set forth under (1) above, wherein the auxiliary magnet pieces each have a tapered portion where a thickness gradually decreases towards a substantially central portion of the main magnet piece, and substantially central portions of the main magnet piece are exposed to the pair of stators.

(3) The axial gap motor as set forth under (1) or (2) above, wherein the main magnet piece, the pair of auxiliary magnet pieces disposed on the one side with respect to the direction of the rotational axis and the pair of auxiliary magnet pieces disposed on the other side with respect to the direction of the rotational axis are integrated together by an adhesive material or through sintering.

(4) The axial gap motor as set forth under any of (1) to (3) above, wherein the magnetic material pole portion is made up of a magnetic member including laminated sheets of silicone steel or formed of a soft magnetic material and has magnetic saliency in the direction of the rotational axis.

(5) The axial gap motor as set forth under (4) above, wherein the magnetic member has a through hole which penetrates therethrough in the direction of the rotational axis.

(6) The axial gap motor as set forth under any of (1) to (5) above, wherein the rotor comprises a non-magnetic rotor frame having a plurality of spokes which are each disposed between the magnet pole portion and the magnetic material pole portion and which each extend in the radial direction, and a shaft portion and a rim portion which are provided at inside diameter sides and at outside diameter sides of the plurality of spokes, respectively.

(7) The axial gap motor as set forth under (6) above, wherein the rotor frame is made up of a first and second frames each having a plurality of spokes which are each disposed between the magnet pole portion and the magnetic material pole portion and which each extend in the radial direction, and a shaft portion and a rim portion which are provided at inside diameter sides and at outside diameter sides of the plurality of spokes, respectively, the first and second frames being attached together in an axial direction.

(8) The axial gap motor as set forth under (7) above, characterized by having holding portions for holding the magnetic material pole portions on outer sides with respect to the direction of the rotational axis of the shaft portions and the rim portions of the first and second rotor frames.

(9) The axial gap motor as set forth under (8) above, wherein circumferentially extending clearance grooves are provided in the magnetic material pole portion which are brought into engagement with the holding portions.

(10) The axial gap motor as set forth under any of (7) to (9) above, wherein claw portions for fixing the magnet pole portions are provided on outer sides with respect to the direction of the rotational axis of the spokes of the first and second frames.

(11) The axial gap motor as set forth under (10) above, wherein radially extending clearance grooves are provided on the magnet pole portions which are brought into engagement with the claw portions of the spokes.

(12) The axial gap motor as set forth under any of (1) to (11) above, wherein a thickness of the spoke is thicker than a gap defined between the rotor and the stator.

(13) The axial gap motor as set forth under any of (6) to (12) above, wherein an insulation layer is provided on a surface of the spoke.

(14) The axial gap motor as set forth under any of (6) to (13) above, wherein the spoke is integrated with an inside diameter side extending portion provided to extend along the shaft portion and an outside diameter side extending portion provided to extend along the rim portion, and the inside diameter side extending portion and the outside diameter side extending portion are joined to the shaft portion and the rim portion, respectively, through welding.

(15) The axial gap motor as set forth under any of (6) to (4) above, wherein an outer ring is fitted on the rim portions of the first and second frames.

(16) The axial gap motor as set forth under (10) above, wherein the spoke is formed together with the claw portion through pressing.

(17) The axial gap motor as set forth under (8) above, wherein the shaft portion and the rim portion are formed together with the holding portions through pressing.

(18) The axial gap motor as set forth under any of (1) to (17) above, characterized by being used in a vehicle.

Advantage of the Invention

According to the configuration of (1) above, since the magnet pole portion is made up of the integral magnet which is arranged in a substantially Halbach fashion by disposing the pair of auxiliary magnet pieces on each of the one side and the other side of the main magnet piece, effective fluxes which are interlinked with each stator are increased relatively, and fluxes other than the fluxes which are directed to the stators converge in an interior of the magnet pole portion. Consequently, short-circuiting of fluxes between the magnet pole portion and the magnetic material pole portion which lies adjacent in the circumferential direction can be suppressed, thereby making it possible to suppress a reduction in torque to be generated and a reduction in efficiency of the motor.

In addition, since fluxes other than fluxes directed to the stators converge in the interior of the magnet pole portion, the thickness of the spoke portions of the rotor frame can be reduced, whereby the occupation ratio of the magnet pole portions and the magnetic material pole portions can be increased, thereby making it possible to increase torque to be generated by the motor.

Further, since the magnet pole portion is made up of the integral magnet which is arranged in the substantially Halbach fashion with the pair of auxiliary magnet pieces disposed on each of the one side and the other side of the main magnet piece in advance, the attachment performance of the magnet pole portion to the rotor frame can be increased, thereby making it possible to simplify the fabrication process.

According to the configuration of (2), since the auxiliary magnet piece has the tapered portion in which the thickness gradually decreases towards the substantially central portion of the main magnet piece, the pole arc angle can easily be regulated by regulating the inclination of the tapered portion.

According to the configuration of (3), the integral magnet can easily be fabricated into which the main magnet piece and the auxiliary magnet pieces are integrated.

According to the configuration of (4), the magnetic member making up the magnetic material pole portion can easily be fabricated.

According to the configuration of (5), the magnetic saliency can easily be imparted to the magnetic member by forming the through hole.

According to the configuration of (6), the rotational torque of the rotor is transmitted to a shaft via the rotor frame.

According to the configuration of (7), the assemblage performance can be increased by dividing the rotor frame in the axial direction.

According to the configuration of (8), the magnetic material pole portions can be held within the rotor frame in an ensured fashion.

According to the configuration of (9), the gap defined between the rotor and the stator can be set minimum by configuring the engagement portions which are brought into engagement with the holding portions as the clearance grooves.

According to the configuration of (10), the magnet pole portions can be held within the rotor frame in an ensured fashion.

According to the configuration of (11), the gap defined between the rotor and the stator can be set minimum by configuring the engagement portions which are brought into engagement with the claw portions as the clearance grooves.

According to the configuration of (12), the thickness of the spoke is made thicker than the gap defined between the rotor and the pair of stators, thereby making it possible to suppress the flow of fluxes between the magnet pole portion and the magnetic material pole portion which lie adjacent to each other in the circumferential direction.

According to the configuration of (13), the generation of eddy current can be suppressed which would otherwise occur between the magnet pole portion and the magnetic material pole portion which lie adjacent to each other in the circumferential direction by providing the insulation layer on the surface of the spoke.

According to the configuration of (14), by forming the spoke by pressing a flat sheet material and welding the spoke so formed to the shaft portion and the rim portion, compared with a case where a single material (a solid material of a circular post-like or circular cylindrical shape) is carved into a rotor frame, the fabrication time can be shortened.

According to the configuration of (15), the rigidity of the rotor frame can be increased by fitting the outer circumferential ring on the rim portion, and the thickness of the rim portion can also be reduced, whereby the rim portion can easily be fabricated by pressing.

According to the configurations of (16) and (17), the strength can be increased by hardening through pressing.

According to the configuration of (18), the motor with good efficiency can be made smaller in size, providing superior installation capability into a vehicle.

BRIEF DESCRIPTION OF THE DRAWINGS

FIGS. 4A to 4C show a rotor, in which FIG. 4A is a front view, FIG. 4B is a sectional view taken along the line IVB-IVB, and FIG. 4C is a sectional view taken along the line IVC-IVC.

FIGS. 9A and 9B show explanatory drawings depicting rotor assembling process, of which FIG. 9A is a front view of the rotor, and FIG. 9B is a sectional view taken along the line IXB-IXB of FIG. 9A.

FIGS. 10A and 10B show explanatory drawings depicting a rotor assembling process, of which FIG. 10A is a front view of the rotor, and FIG. 10B is a sectional view taken along the line XB-XB of FIG. 10A.

FIGS. 11A and 11B show explanatory drawings depicting a rotor assembling process, of which FIG. 11A is a front view of the rotor, and FIG. 11B is a sectional view taken along the line XIB-XIB of FIG. 11A.

FIGS. 12A and 12B shows explanatory drawings depicting a rotor assembling process, of which FIG. 12A is a front view of the rotor, and FIG. 12B is a sectional view taken along the line XIIB-XIIB of FIG. 12A.

FIGS. 13A and 13B shows explanatory drawings depicting a rotor assembling process, of which FIG. 13A is a front view of the rotor, and FIG. 13B is a sectional view taken along the line XIIIB-XIIIB of FIG. 13A.

FIGS. 14A and 14B shows explanatory drawings depicting a rotor assembling process, of which FIG. 14A is a front view of the rotor, and FIG. 14B is a sectional view taken along the line XIVB-XIVB of FIG. 14A.

MODE FOR CARRYING OUT THE INVENTION

Figure 1:
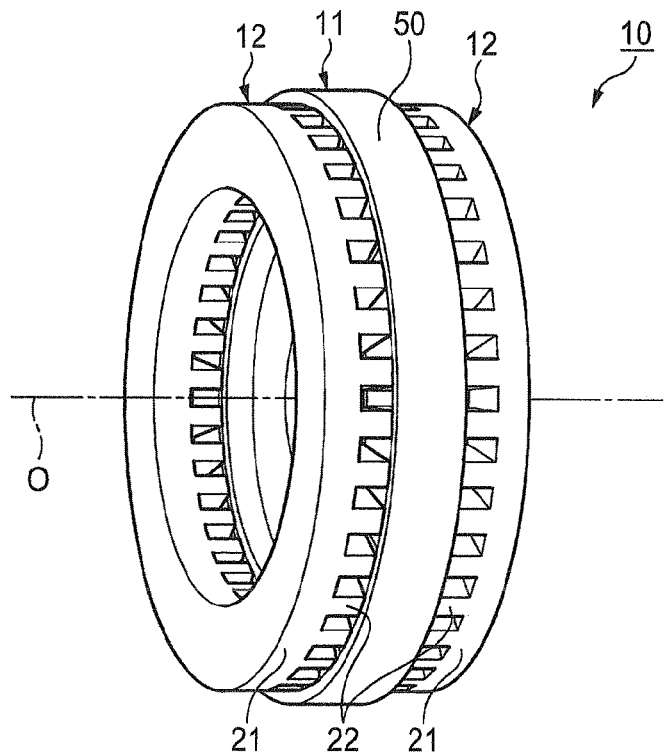
FIG. 1 is an overall perspective view of one embodiment of an axial gap motor according to the invention.
Figure 2:
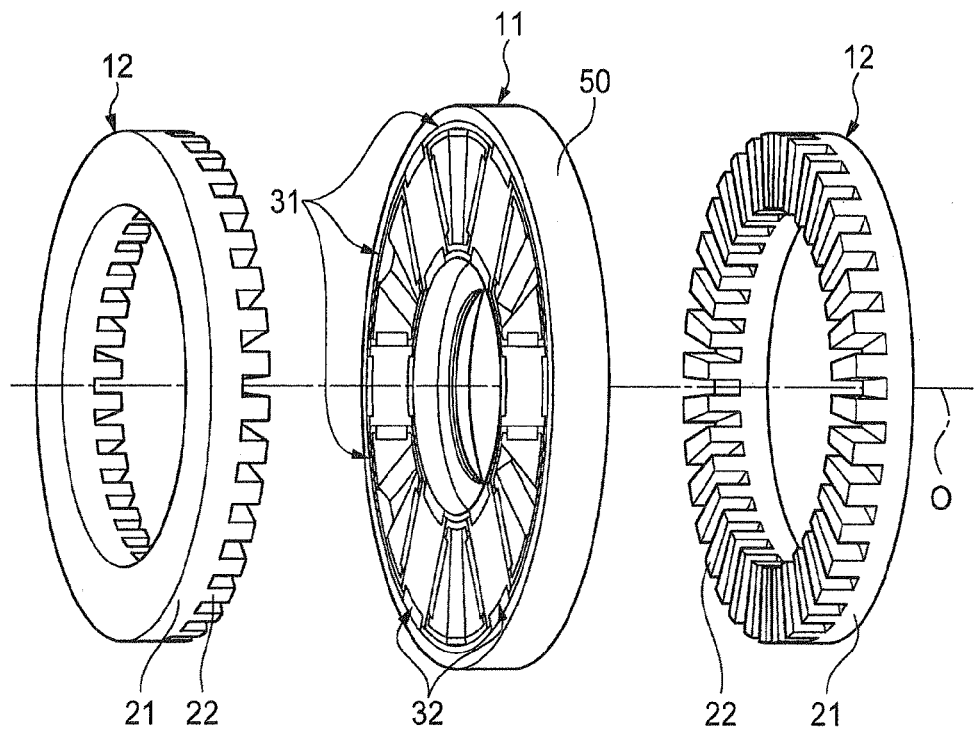
FIG. 2 is an exploded perspective view of the axial gap motor shown in FIG. 1.

Hereinafter, one embodiment of an axial gap motor according to the invention will be described in detail by reference to the accompanying drawings. Note that the drawings are to be seen so that reference numerals given look oriented properly.

An axial gap motor 10 according to this embodiment includes, for example, as is shown in FIG. 1, a substantially annular rotor 11 which is provide rotatably about a rotational axis O of the axial gap motor 10 and a pair of stators 12, 12 which are disposed to face each other so as to hold therebetween the rotor from both sides thereof with respect to the direction of the rotational axis O and which each have stator windings of a plurality of phases which generate rotational fields for rotating the rotor 11.

This axial gap motor 10 is installed as a drive source in a hybrid vehicle or an electric vehicle, for example, and an output shaft thereof is connected to an input shaft of a transmission (not shown), so that driving power of the axial gap motor 10 is transmitted to drive wheels (not shown) of the vehicle via the transmission.

In addition, in the event that the drive force is transmitted to the axial gap motor 10 from the drive wheels when the vehicle is decelerated, the axial gap motor 10 functions as a generator so as to generate so-called regenerative braking force, and the dynamic energy of a vehicle body is recovered as electric energy (regenerative energy). Further, in a hybrid vehicle, for example, in the even that a rotational shaft of the axial gap motor 10 is connected to a crankshaft of an internal combustion engine (not shown), output of the internal combustion engine is transmitted to the axial gap motor. Then, as this occurs, the axial gap motor 10 also functions as the generator and generates dynamic energy.

Each stator 12 includes a substantially annular plate-shaped yoke portion 21, a plurality of tees 22, . . . , 22 which project towards the rotor 11 along the direction of the rotational axis O from positions on a confronting surface of the yoke portion 21 which confronts the rotor 11 which are positioned at predetermined intervals in a circumferential direction and stator windings (no shown) which are installed between the tees 22, 22 as required.

Each stator 12 is of a 6N-type, for example, in which there are six main poles (for example, U+, V+, W+, U−, V−, W−) and the stators 12 are set so that the U+, V+, W+ poles of the one stator 12 face the U−, V−, W− poles of the other stator 12 with respect to the direction of the rotational axis O. For example, relative to the pair of stators 12, 12 which face each other with respect to the direction of the rotational axis O, three tees, 22, 22, 22 of one of the stators 12 which face one of the U+, V+, W+ poles and the U−, V−, W− poles and three tees 22, 22, 22 of the other stator 12 which face the other of the U+, V+, W+ poles and the U−, V−, W− poles are set so as to face each other with respect to the direction of the rotational axis O, so that energization of the tees 22 of the stator 12 facing the other stator 12 with respect to the direction of the rotational axis O and energization of the tees 22 of the other stator 12 are set so as to be reverse in terms of electrical angle.

For example, as is shown in FIGS. 2 to 4C, the rotor 11 includes a plurality of magnet pole portions 31, . . . , 31, a plurality of magnetic material pole portions 32, . . . , 32, a rotor frame 32 made of a non-magnetic material, and an outer circumferential ring 50. The magnet pole portions 31 and the magnetic material pole portions 32 are accommodated within the rotor frame 33 on which the outer circumferential ring 50 is installed in such a state that the magnet pole portions 31 and the magnetic material pole portions 32 are disposed alternately in a circumferential direction.

Figure 5:
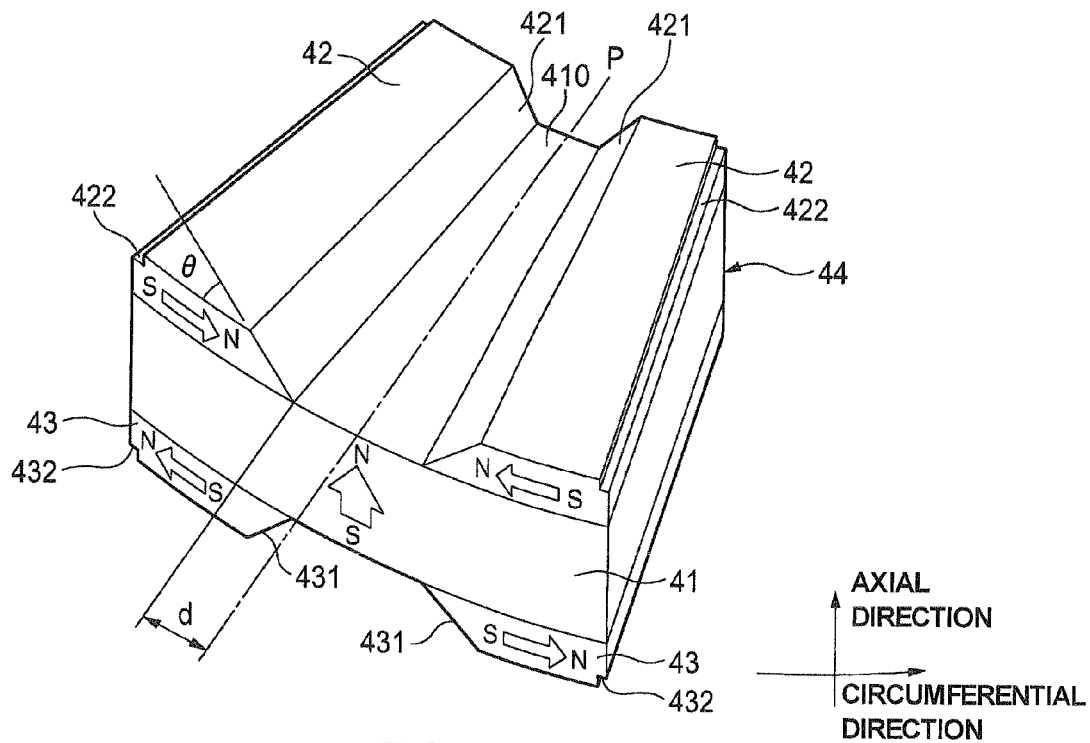
FIG. 5 is an overall perspective view of an integral magnet which makes up a magnet pole portion.

The magnet pole portion 31 is made up of an integral magnet 44 into which are integrated, as is shown in FIG. 5, with an adhesive or through sintering, for example, a main permanent magnet piece 41 in the form of a substantially fan-shaped plate, a pair of first auxiliary permanent magnet pieces 42, 42 which are disposed at circumferential sides of the main permanent magnet piece 41 on one side thereof with respect to the rotational axis O, and a pair of second auxiliary permanent magnet pieces 43, 43 which are disposed at circumferential sides of the main permanent magnet piece 41 on the other side thereof with respect to the rotational axis O.

The main permanent magnet 41 is magnetized in the direction of the rotational axis O, and the respective main permanent magnets 41, 41 of the magnet pole portions 31, 31 which lie adjacent to each other in the circumferential direction with the magnetic material pole portion 32 held therebetween are set so that magnetizing directions thereof differ from each other.

The auxiliary permanent magnet piece 42 (43) has a substantially fan-shaped sheet-like form and has a circumferential length which is equal to or shorter than half that of the main permanent magnet 41. A tapered surface 421 (431) is formed on each of confronting surfaces of the pair of auxiliary permanent magnet pieces 42, 42 (43, 43) in such a way that the thickness of auxiliary permanent magnet piece 42 (43) gradually decreases towards a central portion 410 of the main permanent magnet piece 41. A radially extending clearance groove 422 (433) having an L-shaped section is formed in a corner portion of an opposite surface of the tapered surface 421 (431) which is not brought into contact with the main permanent magnet piece 41. Then, the pair of auxiliary permanent magnet pieces 42, 42 (43, 43) are provided laterally symmetrically with respect to a magnet center line P of the main permanent magnet piece 41. Here, assuming that a distance from the center line P to the tapered surface 421 (431) is referred to as d and an angle of the tapered surface is referred to as θ, d and θ are set so that d>0 and 0<θ<90°. Note that the distance d may be set so as to increase gradually from an inside diameter side towards an outside diameter side as is shown in FIG. 5 or may be constant. By making the distance d increase gradually from the inside diameter side towards the outside diameter side, the area of the central portion 410 of the main permanent magnet piece 41 expands as the volume of the tee of the stator 12 increases. Therefore, the flux can be made uniform, whereby the transmission and reception of flux can be performed more efficiently. In addition, the magnet volume of the auxiliary permanent magnet pieces 42, 42 (43, 43) can be reduced. On the other hand, by making the distance d constant so that the area of the central portion 410 of the main permanent magnet piece 41 is made to correspond to the shape of a slot defined between the tees 22, 22 of the stator 12, the amount of electricity to be generated and the driving force can easily be controlled.

The first auxiliary permanent magnet pieces 42, 42 are magnetized in the direction of the rotational axis and in a direction (a substantially circumferential direction) which is at right angles to a radial direction. The first auxiliary permanent magnet pieces 42, 42 are disposed so that magnetic poles face each other which are the same as a magnetic pole on the one side of the main permanent magnet piece 41 with respect to the direction of the rotational axis. The second auxiliary permanent magnet pieces 43, 43 are magnetized in the direction of the rotational axis and in a direction (a substantially circumferential direction) which is at right angles to a radial direction. The second auxiliary permanent magnet pieces 43, 43 are disposed so that magnetic poles face each other which are the same as a magnetic pole on the other side of the main permanent magnet piece 41 with respect to the direction of the rotational axis.

Namely, relative to the main permanent magnet piece 41 in which the one side is magnetized to an N pole and the other side with respect to the direction of the rotational axis O is magnetized to an S pole, the pair of first auxiliary permanent magnet pieces 42, 42 which are disposed on the one side with respect to the direction of the rotational axis O are disposed so that N poles face each other in the circumferential direction, and the pair of second auxiliary permanent magnet pieces 43, 43 which are disposed on the other side with respect to the direction of the rotational axis O are disposed so that S poles face each other in the circumferential direction. As a result of this arrangement, fluxes of the main permanent magnet piece 41 and the respective pairs of auxiliary permanent magnet pieces 42, 42, 43, 43 converge at the central portion 410 of the main permanent magnet piece 41 due to a flux lens effect, and effective fluxes which are interlinked with the stators 12, 12 are increased relatively.

In addition, the auxiliary permanent magnet pieces 42, 42, 43, 43 face the main permanent magnet piece 41 with respect to the direction of the rotational axis so that the magnetic poles of the auxiliary permanent magnet pieces 42, 42, 43, 43 differ from the magnetic poles of the main permanent magnet piece 41 at circumferential end portions. Namely, relative to the main permanent magnet piece 41 in which the one side is magnetized to the N pole and the other side with respect to the direction of the rotational axis O is magnetized to the S pole, the pair of first auxiliary permanent magnet pieces 42, 42 which are disposed on the one side with respect to the direction of the rotational axis O face the main permanent magnet piece 41 in the direction of the rotational axis O with the S poles disposed at the circumferential end portions of the main permanent magnet piece 41. In addition, the pair of first auxiliary permanent magnet pieces 43, 43 which are disposed on the other side with respect to the direction of the rotational axis O face the main permanent magnet piece 41 in the direction of the rotational axis O with the N poles disposed at the circumferential end portions of the main permanent magnet piece 41. By this arrangement, the fluxes of the main permanent magnet piece 41 and the respective pairs of auxiliary permanent magnet pieces 42, 42, 43, 43 converge in an interior of the integral magnet 44.

Figure 6:
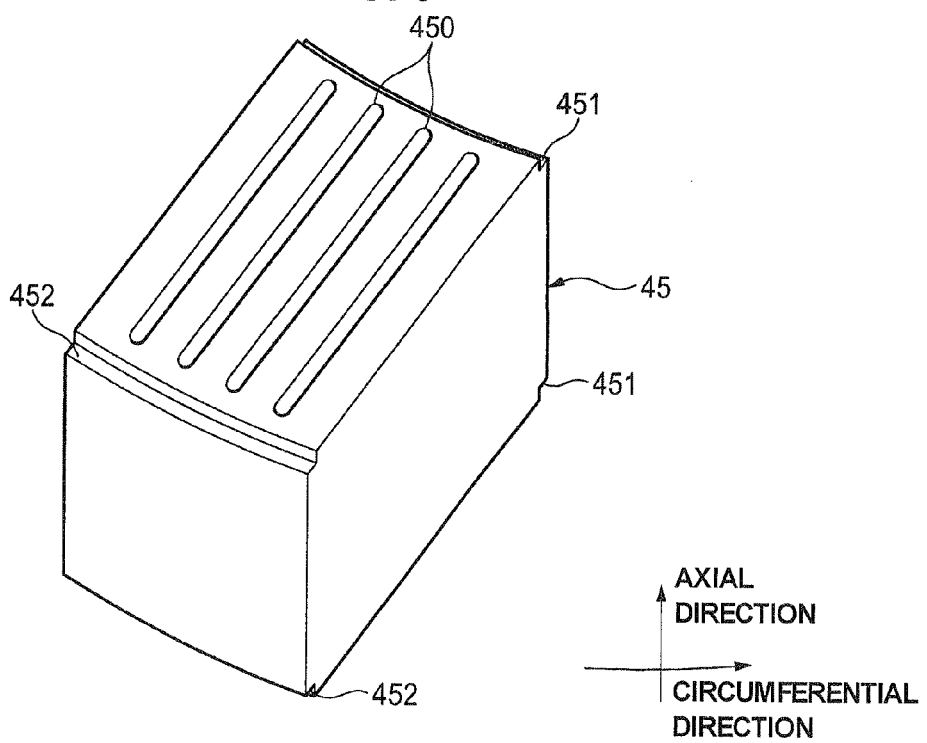
FIG. 6 is an overall perspective view of a magnetic member which makes up a magnetic material pole portion.

As is shown in FIG. 6, the magnetic material pole portion 32 is made up of a magnetic member 45 including a plurality of slits 450, . . . , 450 which penetrate therethrough in a direction parallel to the direction of the rotational axis O. The magnetic member 45 has a uniform width in a circumferential direction and is fabricated by laminating a plurality of sheets of silicone steel or forming and sintering a soft magnetic material such as iron powder. The slit 450 is formed into an elongated hole having a sectional shape with respect to the direction of the rotational axis O in which a radial direction refers to a longitudinal direction, and the plurality of (four herein) slits are disposed at predetermined intervals in the circumferential direction. Circumferentially extending clearance grooves 451, 452 having an L-shaped section are formed in an inner circumferential corner portion and an outer circumferential corner portion, respectively, of the magnetic member 45.

Figure 3:
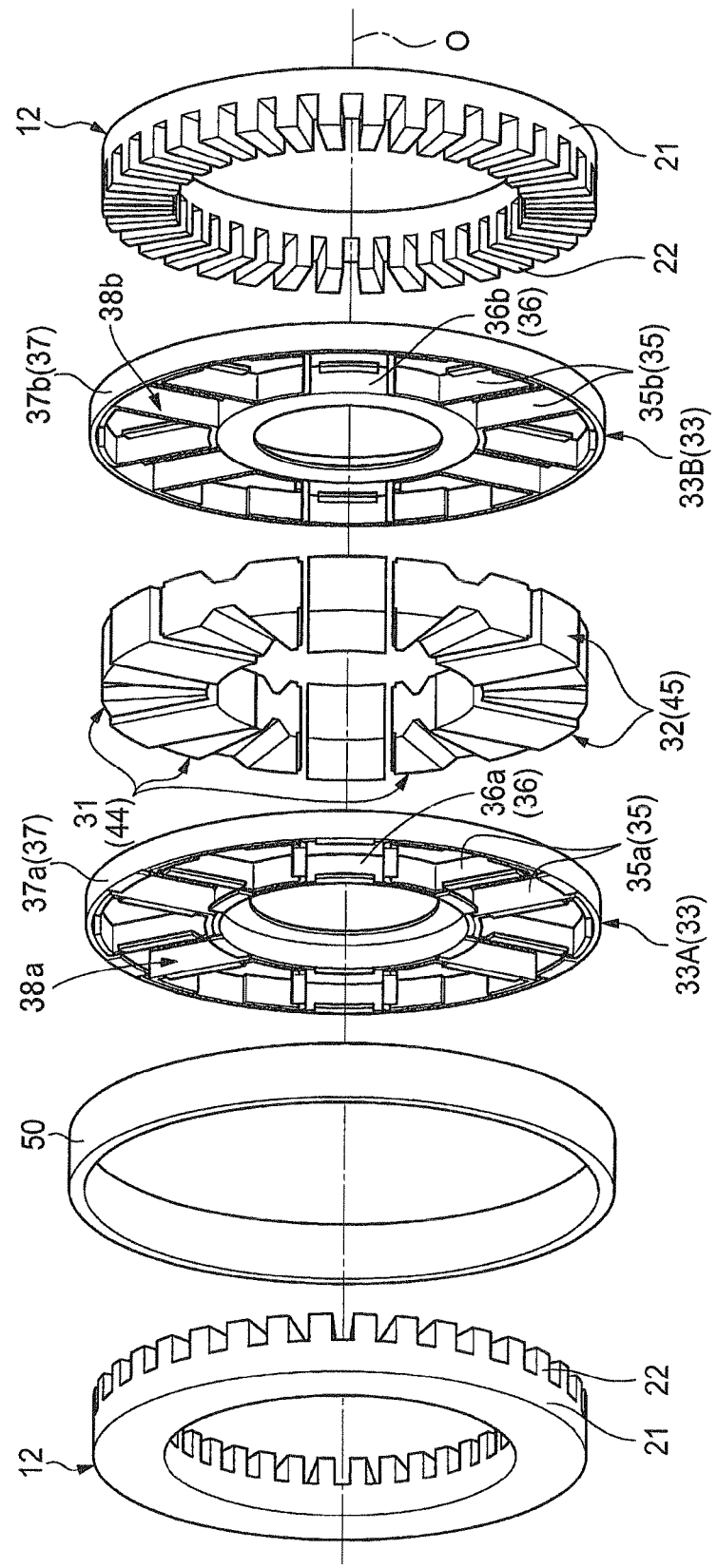
FIG. 3 is an exploded perspective view of the axial gap motor shown in FIG. 1.
Figure 4:
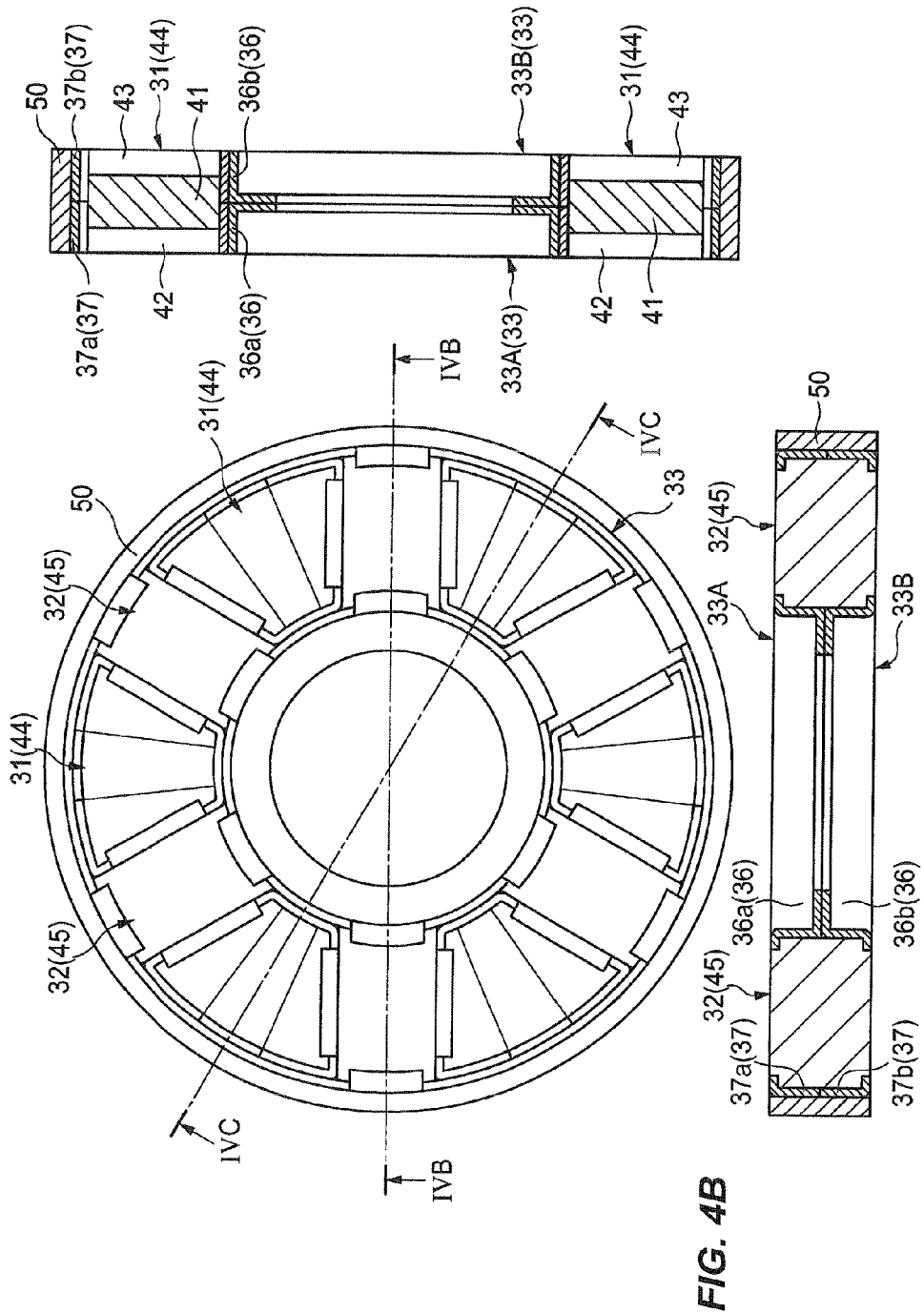

The rotor frame 33 includes, as is shown in FIGS. 3 and 4, for example, a plurality of spokes 35, . . . , 35 which are disposed between the magnet pole portions 31 and the magnetic material pole portions 32 which lie adjacent to each other in the circumferential direction so as to extend in the radial direction, an inner circumferential annular shaft portion 36 and an outer circumferential annular rim portion 37 which are connected together by the spokes 35, . . . , 35, and a connecting portion which is formed at an inner circumferential portion of the shaft portion 36 for connection with an external drive shaft (for example, an input shaft of a transmission of a vehicle).

Figure 7:
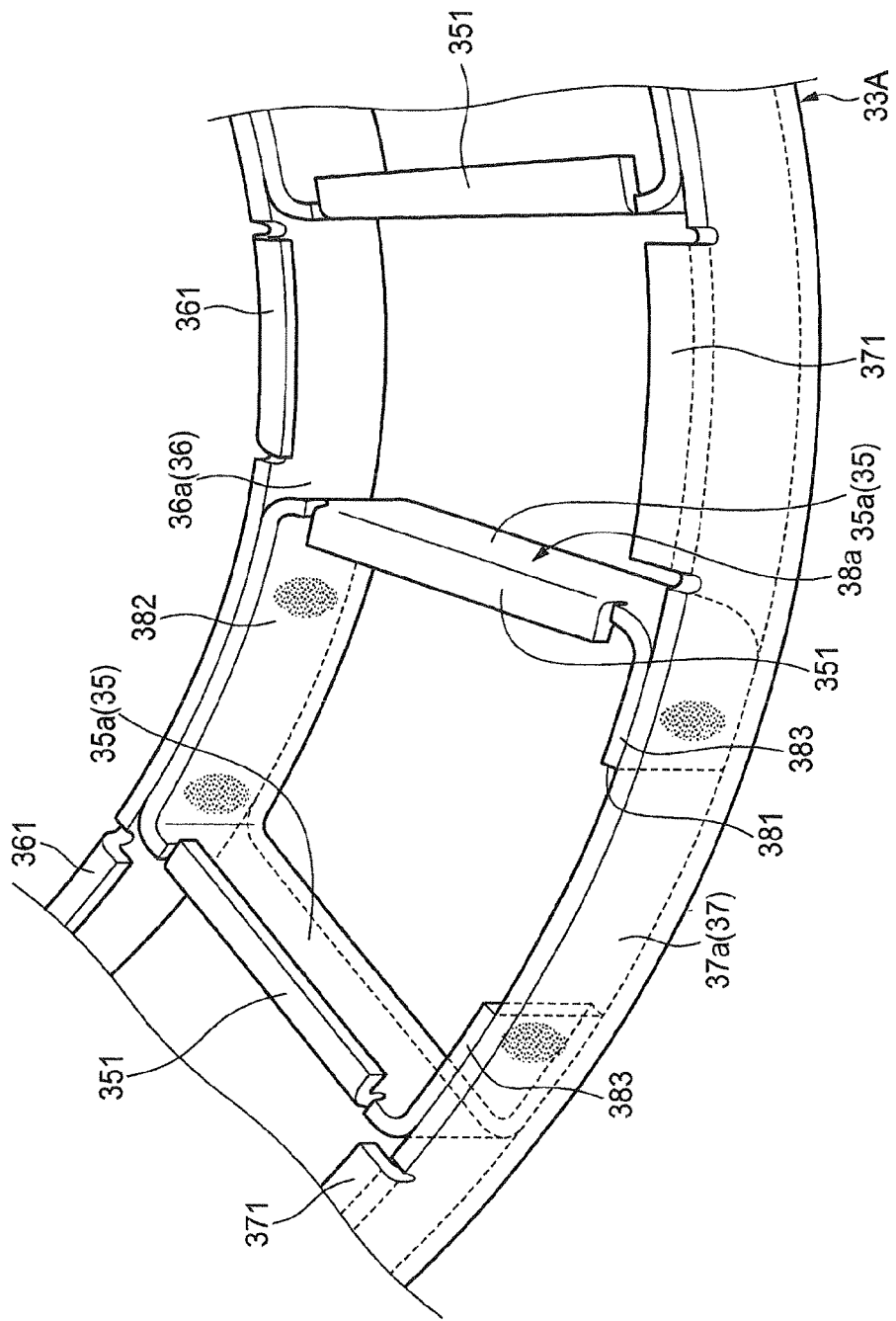
FIG. 7 is a partial perspective view of a first frame which makes up a rotor frame.
Figure 8:
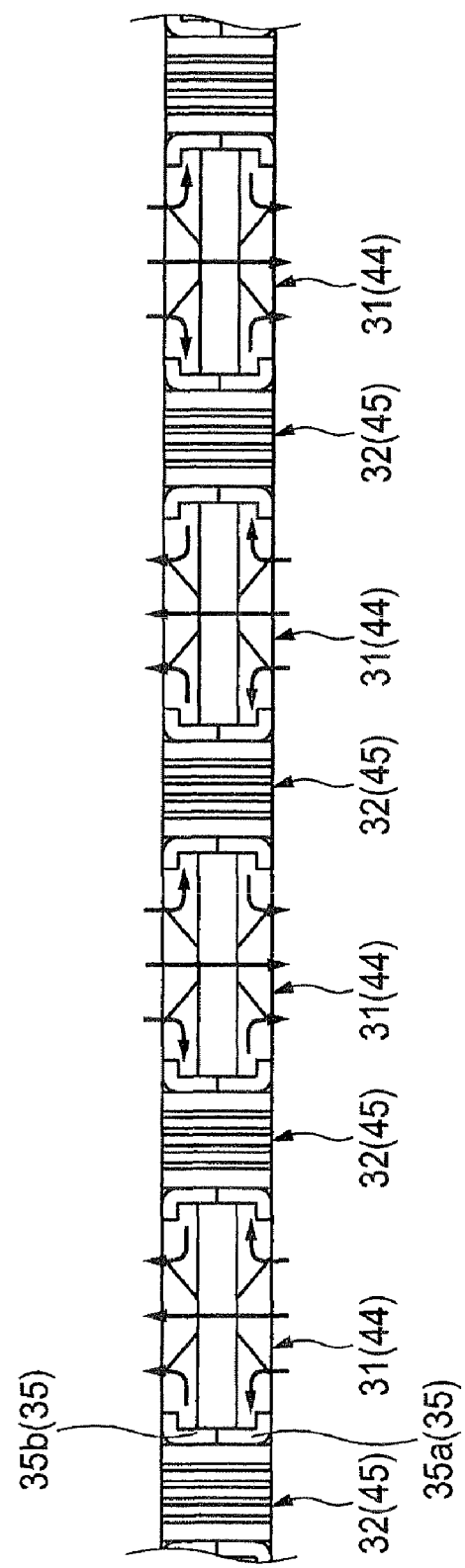
FIG. 8 is a view of magnet pole portions and magnetic material pole portions which are accommodated within the rotor frame as seen in a circumferential direction.
Figure 15:
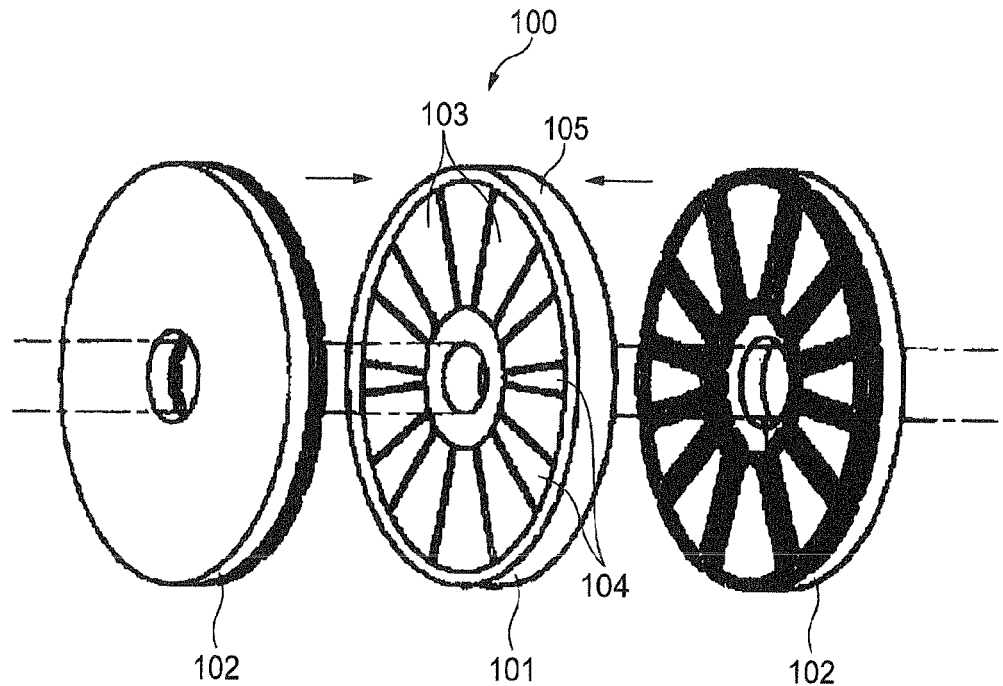
FIG. 15 is a perspective view of an axial gap motor described in Patent Document 1.
Figure 16:
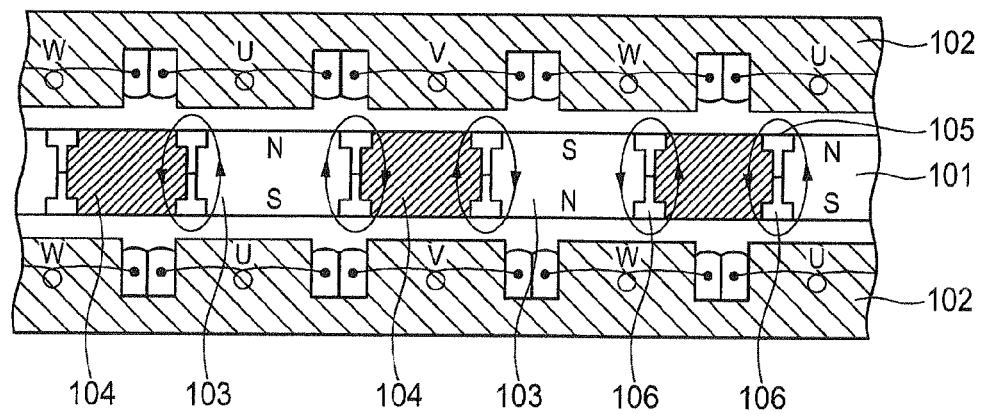
FIG. 16 is a view of the axial gap motor shown in FIG. 15 as seen in a circumferential direction.

To be more specific, the rotor 33 is made up of a first and second frames 33A, 33B which each include a shaft portion 36a (36b) and a rim portion 37a (37b), and a plurality of spoke forming members 38a, . . . , 38a which are disposed between the shaft portion 36a (36b) and the rim portion 37a (37b) and which each include a pair of radially extending spokes 35a, 35a (35b, 35b) (refer to FIG. 7). Then, by attaching the first and second frames 33A, 33B so configured together so as to face each other in an axial direction, the shaft portion 36 of the rotor frame 33 is made up of the shaft portion 36a of the first frame 33A and the shaft frame portion 36b of the second frame 33B, the rim portion 37 of the rotor frame 33 is made up of the rim portion 37a of the first frame 33A and the rim portion 37b of the second frame 33B, and the spokes 35, . . . , 35 of the rotor frame 33 are made up of the spokes 35a of the first frame 33A and the spokes 35b of the second frame 33B. Here, the shaft portion 36a (36b), the rim portion 37a (37b) and the individual spoke forming members 38a, . . . , 38a (38b, . . . , 38b) are each formed of a thin sheet material through pressing.

Then, the integral magnets 44 and the magnetic members 45 are disposed so as to lie adjacent to each other in the circumferential direction via the spokes 35 and are held by the shaft portion 36 and the rim portion 37 therebetween from both sides with respect to a radial direction.

For example, as is shown in FIG. 7, radially outwardly extending holding portions 361, 361 are provided at both end portions of the shaft portion 36 with respect to the direction of the rotational axis O, that is, on one side end portion of the shaft portion 36a with respect to the direction of the rotational axis O and the other side end portion of the shaft portion 36b with respect to the direction of the rotational axis O in positions where the magnetic members 45 of the magnetic material pole portions 32 are accommodated, so as to be brought into engagement with the clearance grooves 451, 451 which are formed in the magnetic members 45. Similarly, radially inwardly extending holding portions 371, 371 are provided at both end portions of the rim portion 37 with respect to the direction of the rotational axis O, that is, on one side end portion of the rim portion 37a with respect to the direction of the rotational axis O and the other side end portion of the rim portion 37b with respect to the direction of the rotational axis O in positions where the magnetic members 45 of the magnetic material pole portions 32 are accommodated, so as to be brought into engagement with the clearance grooves 452, 452 which are formed in the magnetic members 45. By this configuration, the magnetic members 45 are positioned with respect to the direction of the rotational axis O within the rotor frame 33 by the holding portions 361, 371 and are held within the rotor frame 33 in an ensured fashion. As this occurs, the magnetic members 45 and the holding portions 361, 371 are made to be level with each other as viewed in a section taken along a direction which is at right angles to the axis of the motor (refer to FIGS. 12A to 14B). Note that the holding portions 361, 371 are formed together with the shaft portion 36a (36b) and the rim portion 37a (37b), respectively.

For example, as is shown in FIG. 7, the spoke forming member 38a (38b) has a substantially fan shape as viewed in a section taken along the direction at right angles to the axis of the motor so as to surround the integral magnet 44 from the circumferential direction and the radial direction and has an opening 381 formed in a substantially central portion on an outside diameter side. Namely, the spoke forming member 38a (38b) includes the pair of spokes 35a, 35a (35b, 35b) which are provided at both circumferential sides, an inside diameter side extending portion 382 which is provided to extend from inside diameter sides of the spokes 35a, 35a (35b, 35b) along the shaft portion 36a (36b) so as to connect the pair of spokes 35a, 35a (35b, 35b) together, and outside diameter side extending portions 383, 383 which are provided to extend from outside diameter sides of the pair of spokes 35a, 35a (35b, 35b) so as to face each other with the opening 381 interposed therebetween. Then, the shaft portion 36a (36b) and the inside diameter side extending portion 382 are welded to be joined together at both ends of the inside diameter side extending portion 382, and the rim portion 37a (37b) and the outside diameter side extending portions 383, 383 are welded to be joined together.

In addition, claw portions 351, 351 which are bent circumferentially inwards, that is, towards the integral magnet 44 accommodated are provided on one side end portions of the spokes 35a, 35a of the spoke forming member 38a with respect to the direction of the rotational axis O and the other side end portions of the spokes 35b, 35b of the spoke forming member 38b with respect to the direction of the rotational axis O, so as to be brought into engagement with the clearance grooves 422, 422, 432, 432 formed in the respective pairs of auxiliary permanent magnet pieces 42, 42, 43, 43 of the integral magnet 44. By this configuration, the integral magnets 44 are positioned with respect to the direction of the rotational axis O within the rotor frame 33 by the claw portions 351, 351, 351, 351. As this occurs, the auxiliary permanent magnet pieces 42, 42, 43, 43 and the claw portions 351, 351, 351, 351 are made to be level with each other as viewed in a section taken along a direction which is at right angles to the direction of the axis of the motor. Note that the claw portion 351 is formed together with the spoke 35a (35b) through pressing. A thickness (a circumferential length) of the spoke 35a is thicker than a gap between the rotor 11 and the stator 12, and further, an insulation layer may be formed on a front surface of the spoke 35a (35b). By doing so, not only can the flow of fluxes between the magnet pole portion 31 and the magnetic material pole portion 32 which lie adjacent to each other in the circumferential direction be suppressed, but also the generation of eddy current can be suppressed.

The outer circumferential ring 50 is made of a non-magnetic material such as a sheet of stainless steel and is installed on an outer circumferential surface of the rim portion 37 of the rotor frame 33, so as to generate a compression force in the rotor frame 33. Note that any installation method may be adopted, provided that the compression force can be generated in the rotor frame 33, and hence, the outer circumferential ring 50 may be installed on the rotor frame 33 through press fitting or shrink fitting.

Next, an assembling method of the rotor 11 of the axial gap motor 10 of this embodiment will be described. As is shown in FIGS. 9A and 9B, a plurality of spoke forming members 38a, . . . , 38a are disposed on an outer circumferential side of a shaft portion 36a and the shaft portion 36a and the spoke forming members 38a, . . . , 38 are joined together by welding them together at both ends of individual inside diameter side extending portions 382. As this occurs, the shaft portion 36a and the spoke forming members 38a, . . . , 38 are joined together so that holding portions 361 formed on the shaft portion 36a and claw portions 351 formed on spokes 35 lie on the same side with respect to the direction of the rotational axis O. Following this, as is shown in FIGS. 10A and 10B, a rim portion 37a is disposed on outside diameter sides of the spoke forming members 38a, . . . , 38a so that holding portions 371 formed on the rim portion 37a lie on the same side as the holding portions 361 formed on the shaft portion 36a with respect to the direction of the rotational axis O and is then welded to the spoke forming members 38a, . . . , 38a at outside diameter side extending portions 383, 383, whereby a first frame 33A is fabricated.

Following this, as is shown in FIGS. 11A and 11B, integral magnets 44, . . . 44 are installed in the spoke forming members 38a, . . . , 38a of the first frame 33A so that the claw portions 351, 351 formed on the spokes 35 are brought into engagement with clearance grooves 422, 422 formed in auxiliary permanent magnet pieces 42 of the integral magnets 44. Following this, as is shown in FIGS. 12A and 12B, magnetic members 45, . . . , 45 are installed between the spoke forming members 38a, 38a which lie adjacent to each other in the circumferential direction so that clearance grooves 451, 452 formed in the magnetic members 45 are brought into engagement with the holding portions 361 formed on the shaft portion 36a and the holding portions 371 formed on the rim portion 37a.

Then, as is shown in FIGS. 13A and 13B, a second frame 33B which is fabricated in a similar way to the first frame 33A is attached to the first frame 33A from an opposite side with respect to the direction of the rotational axis O, and an outer circumferential ring 50 is press fitted on outer circumferential surfaces of the rim portions 37a, 37b as is shown in FIGS. 14A and 14B.

Thus, as has been described heretofore, according to the axial gap motor 10 of the embodiment, since the magnet pole portion 31 is made up of the integral magnet 44 which is arranged in a substantially Halbach fashion by disposing the pairs of auxiliary permanent magnet pieces 42, 42, 43, 43 on the one side and the other side of the main permanent magnet piece 41, effective fluxes which are interlinked with the stators 12, 12 are increased relatively, and fluxes other than fluxes which are directed to the stators 12, 12 converge in an interior of the integral magnet 44 which making up the magnet pole portion 31. Consequently, short-circuiting of fluxes between the magnet pole portion 31 and the magnetic member 45 of the magnetic material pole portion 32 which lies adjacent in the circumferential direction can be suppressed, thereby making it possible to suppress a reduction in torque to be generated and a reduction in efficiency of the motor.

In addition, since fluxes other than fluxes directed to the stators 12, 12 converge in the interior of the integral magnet 44, the thickness of the spokes 35 of the rotor frame 36 can be reduced, whereby the occupation ratio of the magnet pole portions 31 and the magnetic material pole portions 32 can be increased, thereby making it possible to increase torque to be generated by the motor.

Further, since the magnet pole portion 31 is made up of the integral magnet 44 which is arranged in the substantially Halbach fashion with the pairs of auxiliary magnet pieces 42, 42, 43, 43 disposed on the one side and the other side of the main permanent magnet piece 41 in advance, the attachment performance of the magnet pole portion to the rotor frame 33 can be increased, thereby making it possible to simplify the fabrication process.

In addition, according to the axial gap motor 10 of the embodiment, since the auxiliary permanent magnet pieces 42, 42, 43, 43 each have the tapered surface 421 (431) in which the thickness of the auxiliary permanent magnet piece gradually decreases towards the substantially central portion 410 of the main permanent magnet piece 41, the pole arc angle can easily be regulated by regulating the inclination of the tapered surface 421 (431).

In addition, according to the axial gap motor 10 of the embodiment, the integral magnet 44 can easily be fabricated by integrating the main permanent magnet piece 41 and the pairs of auxiliary permanent magnet pieces 42, 42, 43, 43 together by the adhesive material or through sintering. In addition, the magnetic member 45 making up the magnetic material pole portion 32 is fabricated by laminating the sheets of silicone steel or forming and sintering the soft magnetic material, whereby the magnetic member 45 can easily be fabricated. In addition, by forming the slits 450 in the magnetic member 45, the magnetic saliency can easily be imparted to the magnetic member 45.

Additionally, according to the axial gap motor 10 of this embodiment, the assemblage performance can be increased by dividing the rotor frame 33 which transmits the rotational torque in the axial direction.

In addition, according to the axial gap motor 10 of this embodiment, since the holding portions 361, 371 for holding the magnetic members 45 of the magnetic pole portions 32 are provided on the outer sides with respect to the direction of the rotational axis O of the shaft portion 36a (36b) and the rim portion 37a (37b), respectively, and the clearance grooves 451, 452 which are brought into engagement with the holding portions 361, 371, respectively, are provided on the magnetic members 45, the magnetic members 45 can be held within the rotor frame 33 in an ensured fashion. In addition, the gap defined between the rotor 11 and the stator 12 can be set minimum by configuring the engagement portions which are brought into engagement with the holding portions 361, 371 as the clearance grooves 451, 452. Further, since the shaft portion 36a (36b) and the rim portion 37a (37b) are formed together with the holding portions 361, 371, respectively, through pressing, the strength can be increased by hardening through pressing.

Additionally, according to the axial gap motor 10 of this embodiment, the claw portions 351 which fix the integral magnets 44 of the magnet pole portions 31 in place are provided on the outer sides with respect to the direction of the rotational axis O of the spokes 35a (35b) and the clearance grooves 422, 432 which are brought into engagement with the claw portions 351 are provided on the integral magnets 44, the integral magnets 44 can be held within the rotor frame 33 in an ensured fashion. Further, since the spokes 35a (35b) can formed together with the claw portions 351 through pressing, the strength can be increased by hardening through pressing.

In addition, according to the axial gap motor 10 of this embodiment, since the thickness of the spokes 35a (35b) is set thicker than the gap defined between the rotor 11 and the stator 12, the flow of fluxes between the integral magnet 44 of the magnet pole portion 31 and the magnetic member 45 of the magnetic material pole portion 32 which lie adjacent to each other in the circumferential direction can be suppressed. In addition, the generation of eddy current can be suppressed by providing the insulation layers on the front surfaces of the spokes 35a (35b).

Additionally, according to the axial gap motor 10 of this embodiment, the spokes 35a (35b) are integrated with the inside diameter side extending portion 382 which is provided to extend along the shaft portion 36a (36b) and the outside diameter side extending portions 383, 383 which extend along the rim portion 37a (37b), and the inside diameter side extending portion 382 and the outside diameter side extending portions 383, 383 are joined to the shaft portion 36a (36b) and the rim portion 37a (37b), respectively, through welding. Therefore, the spokes 35a (35b), the shaft portion 36a (36b) and the rim portion 37a (37b) can be fabricated through pressing, and compared with a case where the rotor frame 33 is carved from a single material (a circular post-like or circular cylindrical solid material), the fabrication time can be shortened.

Further, the spokes 35a, 35a (35b, 35b) which lie adjacent to each other in the circumferential direction can be integrated together by the inside diameter side extending portion 382 and/or the outside diameter side extending portions 383, 383 and are formed as the spoke forming member 38a (38b) from the single flat sheet, and therefore, the number of parts can be reduced, thereby making it possible to simplify the assembling process.

Additionally, according to the axial gap motor 10 of this embodiment, by fitting the outer circumferential ring 50 on the rim portion 37 of the rotor frame 33, not only can the rigidity of the rotor frame 33 be increased, but also the rim portion 37 can be made thin in thickness, whereby the rim portion 37 can easily be fabricated through pressing.

Note that the invention is not limited to the embodiment that has been described heretofore but can be modified as required without departing from the spirit and scope of the invention.

For example, while the tapered surfaces 421 (431) are formed on the auxiliary permanent magnet pieces 42, 42 (43, 43), the tapered surfaces 421 (431) do not necessarily have to be formed.

In addition, while the spokes 35a, 35a (35b, 35b) which lie adjacent to each other in the circumferential direction are connected to each other by the inside diameter side extending portion 382 of the spoke forming member 38a (38b), the spokes 35a, 35a (35b, 35b) may be connected to each other by the outside diameter side extending portions 383 or by both the inside diameter side extending portion 382 and the outside diameter side extending portions 383. Alternatively, the spokes 35a, 35b may be provided independently of each other.

DESCRIPTION OF REFERENCE NUMERALS AND CHARACTER

10 Axial gap motor; 11 Rotor; 12 Stator; 31 Magnet pole portion; 32 Magnetic material pole portion; 33 Rotor frame; 33A First frame; 33B Second frame; 35, 35a, 35b Spoke; 351 Claw portion; 36, 36a, 36b Shaft portion; 361 Holding portion; 37, 37a, 37b Rim portion; 371 Holding portion; 38a, 38b Spoke forming member; 382 Inside diameter side extending portion; 383 Outside diameter side extending portion; 41 Main permanent magnet piece (Main magnet piece); 410 Central portion; 42 Auxiliary permanent magnet piece (Auxiliary magnet piece); 421 Tapered surface (Tapered portion); 422 Clearance groove; 43 Auxiliary permanent magnet piece (Auxiliary magnet piece); 431 Tapered surface (Tapered portion); 432 Clearance groove; 44 Integral magnet; 45 Magnetic member; 450 Slit (Through hole); 451 Clearance groove; 452 Clearance groove; 50 Outer circumferential ring; O Rotational axis.

The invention claimed is:

1. An axial gap motor comprising:
a rotor rotatable about a rotational axis; and
a pair of stator disposed to face each other so as to hold therebetween the rotor from both sides thereof with respect to the direction of the rotational axis, wherein:
the rotor comprises:
magnet pole portions disposed at predetermined intervals in a circumferential direction; and
magnetic material pole portions disposed to lie between the magnet pole portions disposed adjacent thereto in the circumferential direction; and
the magnet pole portion is made up of an integral magnet that is integral with a main magnet piece that is magnetized in the direction of the rotational axis, a pair of auxiliary magnet pieces disposed at circumferential sides on one side of the main magnet piece with respect to the direction of the rotational axis, each auxiliary magnet piece being magnetized in the direction of the rotational axis and a direction that is orthogonal relative to a radial direction and wherein magnetic poles face each other, the magnetic poles facing each other being the same as a magnetic pole on the one side of the main magnet piece with respect to the direction of the rotational axis, and a pair of auxiliary magnet pieces disposed at circumferential sides on the other side of the main magnet piece with respect to the direction of the rotational axis, each auxiliary magnet piece being magnetized in the direction of the rotational axis and a direction that is orthogonal relative to a radial direction and wherein magnetic poles face each other, the magnetic poles facing each other being the same as a magnetic pole on the other side of the main magnet piece with respect to the direction of the rotational axis, with portions of the main magnet piece being exposed to the pair of stators, and wherein:
the auxiliary magnet pieces each have a tapered portion where a thickness gradually decreases towards a substantially central portion of the main magnet piece; and
substantially central portions of the main magnet piece are exposed to the pair of stators.

2. The axial gap motor according to claim 1, wherein the main magnet piece, the pair of auxiliary magnet pieces disposed on the one side with respect to the direction of the rotational axis and the pair of auxiliary magnet pieces disposed on the other side with respect to the direction of the rotational axis are integrated together by an adhesive material or through sintering.

3. The axial gap motor according to claim 1, wherein the magnetic material pole portion is made up of a magnetic member comprising laminated sheets of silicone steel or formed of a soft magnetic material and has magnetic saliency in the direction of the rotational axis.

4. The axial gap motor according to claim 3, wherein the magnetic member has a through hole which penetrates therethrough in the direction of the rotational axis.

5. The axial gap motor according to claim 1, wherein the rotor comprises a non-magnetic rotor frame having a plurality of spokes which are each disposed between the magnet pole portion and the magnetic material pole portion and wherein each spoke extends in the radial direction, and a shaft portion and a rim portion provided at inside diameter sides and at outside diameter sides of the plurality of spokes, respectively.

6. The axial gap motor according to claim 5, wherein the rotor frame includes first and second frames, each frame having a plurality of spokes, each spoke being disposed between the magnet pole portion and the magnetic material pole portion and extending in the radial direction, and a shaft portion and a rim portion provided at inside diameter sides and at outside diameter sides of the plurality of spokes, respectively, the first and second frames being attached together in an axial direction.

7. The axial gap motor according to claim 6, wherein holding portions for holding the magnetic material pole portions are provided on outer sides with respect to the direction of the rotational axis of the shaft portions and the rim portions of the first and second rotor frames.

8. The axial gap motor according to claim 7, wherein circumferentially extending clearance grooves are provided in the magnetic material pole portion brought into engagement with the holding portions.

9. The axial gap motor according to claim 6, wherein claw portions for fixing the magnet pole portions are provided on outer sides with respect to the direction of the rotational axis of the spokes of the first and second frames.

10. The axial gap motor according to claim 9, wherein radially extending clearance grooves are provided on the magnet pole portions brought into engagement with the claw portions of the spokes.

11. The axial gap motor according to claim 1, wherein a thickness of the spoke is thicker than a gap defined between the rotor and the stator.

12. The axial gap motor according to claim 5, wherein an insulation layer is provided on a surface of the spoke.

13. The axial gap motor according to claim 5, wherein:
the spoke is integrated with an inside diameter side extending portion provided to extend along the shaft portion and an outside diameter side extending portion provided to extend along the rim portion; and
the inside diameter side extending portion and the outside diameter side extending portion are joined to the shaft portion and the rim portion, respectively, through welding.

14. The axial gap motor according to claim 6, wherein an outer ring is fitted on the rim portions of the first and second frames.

15. The axial gap motor according to claim 9, wherein the spoke is formed together with the claw portion through pressing.

16. The axial gap motor according to claim 7, wherein the shaft portion and the rim portion are formed together with the holding portions through pressing.

17. The axial gap motor according to claim 1, wherein the axial gap motor is used in a vehicle.

* * * * *